United States Patent [19]

Kuhn et al.

[11] 3,924,725

[45] Dec. 9, 1975

[54] DUAL ARRAY DISC PRINTER

[75] Inventors: Robert F. Kuhn, Montrose, Pa.; Theodore F. Lyons; Jerry W. Raider, both of Endicott, N.Y.

[73] Assignee: International Business Machines Corporation, Armonk, N.Y.

[22] Filed: June 28, 1974

[21] Appl. No.: 484,022

[52] U.S. Cl. ............ 197/53; 101/93.19; 101/93.33

[51] Int. Cl.$^2$ ............ B41J 1/32

[58] Field of Search ........... 197/1 R, 18, 49, 53, 54; 101/93.09, 93.16–93.19, 93.28, 93.33

[56] References Cited

UNITED STATES PATENTS

| | | | |
|---|---|---|---|
| 3,356,199 | 12/1967 | Robinson | 197/53 X |
| 3,504,623 | 4/1970 | Staller | 101/93.33 |
| 3,651,916 | 3/1972 | Becchi | 197/54 |
| 3,710,912 | 1/1973 | Bretti et al. | 197/49 |
| 3,719,139 | 3/1973 | Niccolai | 101/93.09 |
| 3,760,925 | 9/1973 | Bossi | 197/18 X |
| 3,787,884 | 1/1974 | Demer | 197/1 R X |
| 3,797,387 | 3/1974 | Decker et al. | 101/93.09 |
| 3,805,941 | 4/1974 | Cattaneo | 197/53 |

*Primary Examiner*—J. Reed Fisher
*Assistant Examiner*—R. T. Rader
*Attorney, Agent, or Firm*—Francis V. Giolma

[57] ABSTRACT

The gap usually required in the arrangement of type characters around the periphery of the print disc in a rotating disc printer to provide time for hammer settle-out is obviated by having two separate type arrays on the disc, one of primarily lower case characters followed by one of primarily upper case characters. To minimize reach the print hammer is movably supported so as to be shifted relative to the print position from a normal lower case position to a special upper case position so as to strike the type on the disc over two different ranges of positions — one range for lower case and a different range for upper case.

9 Claims, 20 Drawing Figures

DUAL ARRAY DISC PRINTER

BACKGROUND OF THE INVENTION

Description of the Prior Art

U.S. Pat. No. 2,949,846 which issued on Aug. 23, 1960 to P. R. Hoffman, et al. discloses the use of helically arranged type on a drum together with a wide print hammer for printing in each of two columns with one type array.

U.S. Pat. No. 2,926,602 which issued on Mar. 1, 1960 to D. N. MacDonald, et al. discloses the use of a drum having a helical array of type to compensate for movement of the drum along the print line while printing.

U.S. Pat. No. 3,356,199 which issued on Dec. 5, 1967 to L. P. Robinson discloses the use of a helical arrangement of type on a type disc which is moved along the print line together with a hammer assembly.

U.S. Pat. No. 3,371,766 which issued on Mar. 5, 1968 to K. J. Staller discloses the use of a print disc with the characters laid out to compensate for shift of the print disc along the print line while rotating.

SUMMARY OF THE INVENTION

Generally stated, it is an object of the invention to provide an improved disc or drum printer in which the time required for hammer settle-out is obviated by utilizing two or more character arrays which together fully populate the disc or drum.

A fully populated disc is achieved by separating the type characters into two or more groups, with lower case characters on one portion of the disc and upper case on another portion, or as to provide adequate time for hammer settle-out between printing successive lower case or upper case characters.

Another object of the invention is to provide for shifting the position of the print hammer so as to reduce the reach and keep the print hammer more nearly in front of the printed column at all times. Alternatively reach can be reduced by shifting the carrier and hammer.

Other objects will in part be obvious and will in part be described in the following more particular description of preferred embodiments of the invention as illustrated in the accompanying drawing.

DESCRIPTION OF PREFERRED EMBODIMENTS

Figure 1:
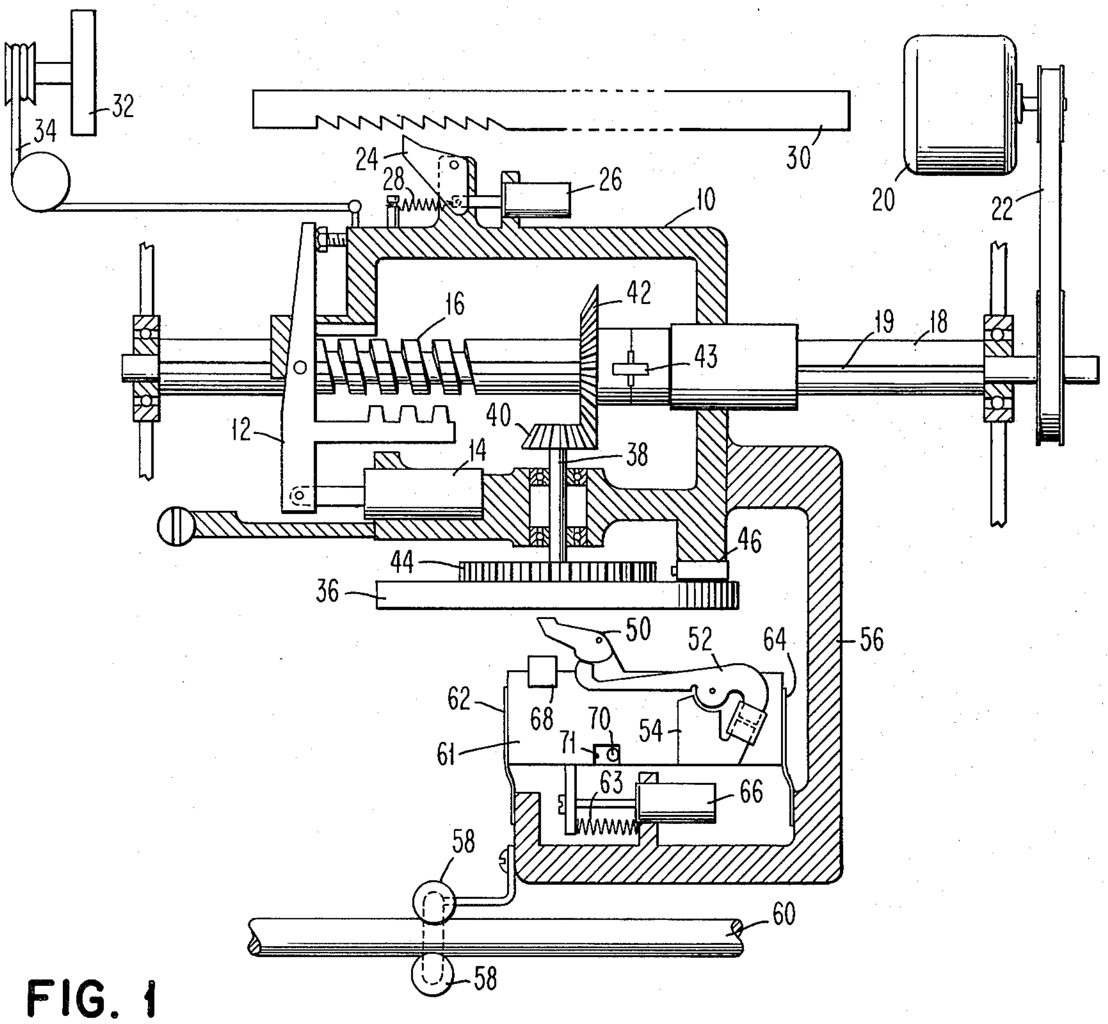
FIG. 1 is a schematic diagram of a rotating disc printer embodying the invention in one of its forms.

Referring to FIG. 1 the reference numeral 10 denotes generally a carrier, which may be, for example, a casting which is disposed to be moved along the print line in a disc printer by means of a pivoted half nut 12 which is operated by a solenoid 14 for engaging the teeth 16 of a helically threaded lead screw 18 which is driven by means of a motor 20 and a belt 22. A pawl 24 operated by a pawl solenoid 26 is biased by a spring 28 to engage the teeth of a rack 30 for positioning the carrier casting along the print line. A clock type spring 32 connected by means of a cord 34 to the carrier 10 provides for returning the carrier to the left hand or home position when the split nut 12 is disengaged from the lead screw 18. The carrier 10 has a rotatable print disc 36 mounted thereon by means of a shaft 38 and arranged to be driven by means of bevel gears 40 and 42, the bevel gear 42 being slidably disposed on the lead screw 18 and connected in driving relation therewith by means of a key way 19 in the lead screw and a roller key 43 disposed in the key way 19. A tooth emitter 44 is mounted on the shaft 38 and provided with a transducer 46 for producing timing pulses in timed relation with the rotation of the print disc 36.

A pivoted print hammer 50 actuated by the armature 52 of an electromagnetic actuator 54 is mounted on the carrier 10 by means of a yoke 56 connected to the carrier 10 and carries guide rollers 58 which engage a guide rod 60 for supporting the yoke and carrier. The print hammer 50 is mounted on the yoke 56 by means of a hammer support 61 and flexible leaf spring supports 62 and 64. A spring 63 biases the hammer support 61 and hammer 50 to the left. A shift solenoid 66 operatively connects the yoke 56 and the hammer support 61 on which the print hammer 50 is mounted, so as to provide for deflecting the support springs 62 and 64 to shift the print hammer 50 to the right relative to the carrier casting when the solenoid 66 is energized.

Figure 2:
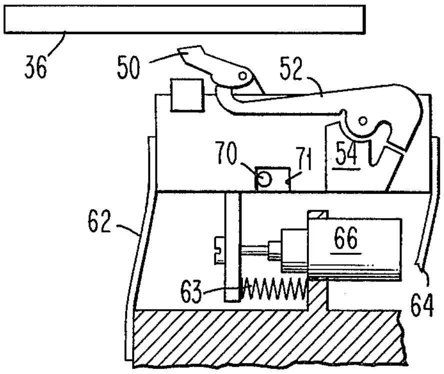
FIG. 2 is a partial schematic view of the hammer shift mechanism of FIG. 1 showing it in the shifted position.

Referring to FIG. 2 it will be seen that the hammer support 61 is biased to the left by means of the compression spring 63 to place the print hammer 50 to the left of the center line of the print wheel 36, the particular position being determined by a shift stop 70 positioned in a notch 71 in the hammer support 61. When the shift solenoid 66 is energized the hammer support 61 is moved to the right, compressing the spring 63 and positioning the hammer 50 to the right of the center line of the print wheel 36.

Figure 3:
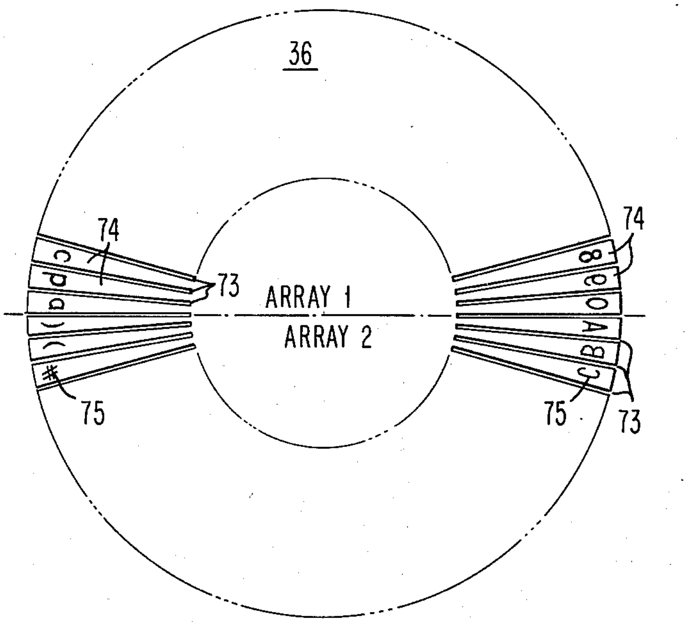
FIG. 3 is a partial front view of a typical type disc and type arrays used in the printer in FIG. 1.

Referring to FIG. 3 it will be seen that the print wheel 36 may comprise a disc having a plurality of radial slots 73 defining flexible type carrying fingers 74 having type characters 75 on one face thereof adjacent the periphery of the disc. As shown, the type disc 36 may be arranged with two different arrays of type characters each occupying one half the periphery of the disc with no intentional gap left therebetween. By dividing the type characters into two arrays, one containing the more commonly used characters and the other the less commonly used characters, for example array number 1 containing principally lower case characters and numerals, and array number 2 containing principally upper case characters and special characters, adequate time will be provided for the hammer 50 to settle between printing successive lower case characters or numerals, during the passage of the upper case characters past a print hammer.

The characters on the print disc are presented to the hammer 50 in the following order: lower case, upper case, lower case, upper case, etc., as the disc continuously rotates. By arranging the characters in this order, time for hammer settle-out is provided by allowing an extra half revolution each time a shift from upper to lower case or from lower to upper case is made. On a disc printer where the characters move along the print line instead of across it, the characters must be placed far enough apart so that the hammer hits only one character. The result is normally an undesirably large print wheel diameter and high peripheral velocity. This is overcome by moving the hammer 50 to be more nearly in front of the printed column at print time. There are four ways the hammer 50 can be moved with respect to the printed columns.

I. Move the hammer 50 with respect to the carrier as shown in FIG. 1.

Figure 8:
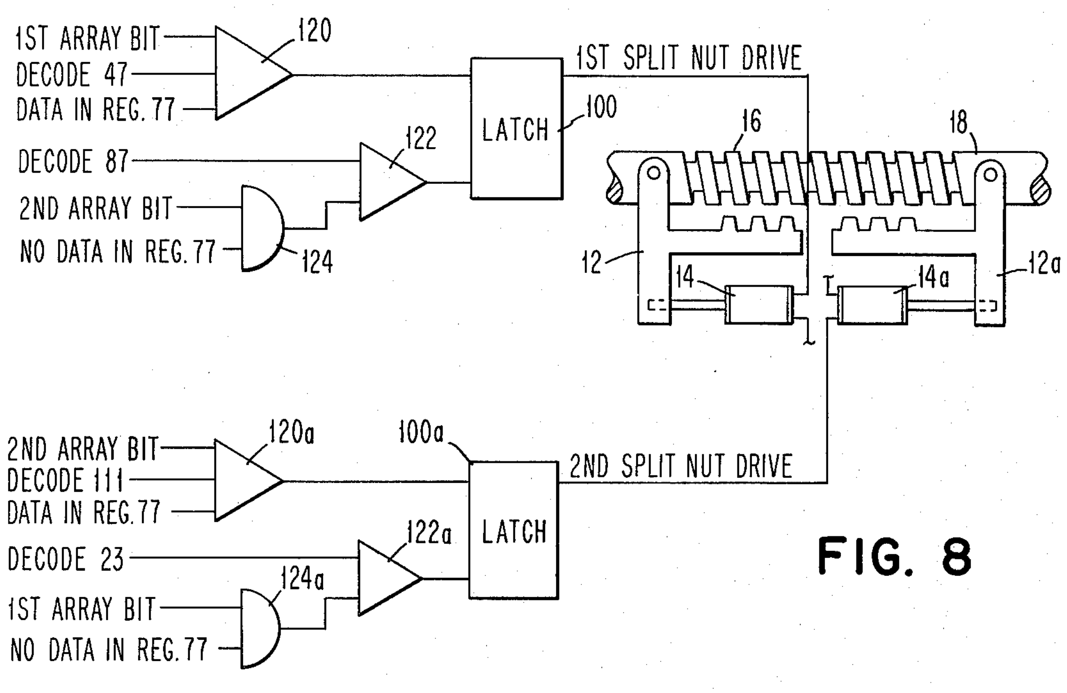
FIG. 8 is a partial schematic diagram of a double half nut carrier drive.

II. Move the hammer 50 with respect to the lead screw by having a second half nut displaced from the first as shown in FIG. 8.

III. Move the hammer 50 with respect to the lead screw by using a pitch of 0.050 in. instead of 0.100 in. and utilizing a two start per revolution thread.

IV. Move the hammer with respect to the frame by moving the lead screw or other driving means, carrier, and hammer.

The following table is an example showing where the hammer is physically located as printing takes place when printing in columns on 0.100 centers from zero.

| Rotations or Time | Shift Status | Column of Printing | Hammer Position (in.) |
|---|---|---|---|
| 1st Rev l.c. | l.c. | 1 | .075 to .125 |
| 1st " U.C. | l.c. | — | .125 to .175 |
| 2nd " l.c. | l.c. | 2 | .175 to .225 |
| 2nd " U.C. | l.c. | — | .225 to .275 |
| 3rd " l.c. | l.c. | 3 | .275 to .325 |
| 3rd " U.C. | shift to U.C. | — | — |
| 4th " l.c. | U.C. | — | .325 to .375 |
| 4th " U.C. | U.C. | 4 | .375 to .425 |
| 5th " l.c. | U.C. | — | .925 to .975 |
| 5th " U.C. | U.C. | 5 | .975 to .525 |
| 6th " l.c. | U.C. | — | .525 to .575 |
| 6th " U.C. | U.C. | 6 | .575 to .625 |
| 7th " l.c. | shift to l.c. | — | — |
| 7th " U.C. | l.c. | — | .625 to .675 |
| 8th " l.c. | l.c. | 7 | .675 to .725 |
| 8th " U.C. | l.c. | — | .725 to .775 |
| 9th " l.c. | l.c. | 8 | .775 to .825 |
| 9th " U.C. | l.c. | — | .825 to .875 |
| 10th " l.c. | l.c. | 9 | .875 to .925 |
| 10th " U.C. | l.c. | — | .925 to .975 |

Figure 4A:
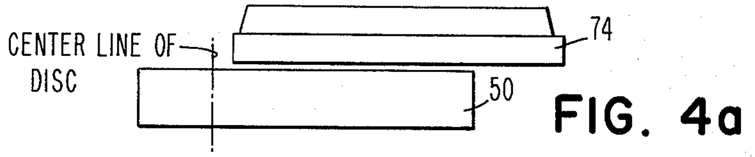
FIGS. 4*a* and 4*b* are partial schematic views of the print hammer and type showing the different reach conditions for a right-shifted print hammer as shown in FIG. 2.
Figure 4B:
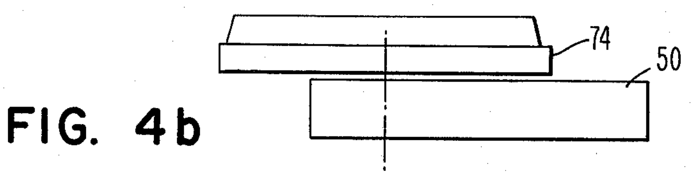
Figure 4C:
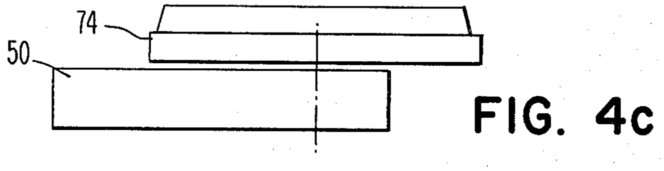
FIGS. 4*c* and 4*d* show the different reach conditions for a left-shifted hammer as shown in FIG. 1.
Figure 4D:
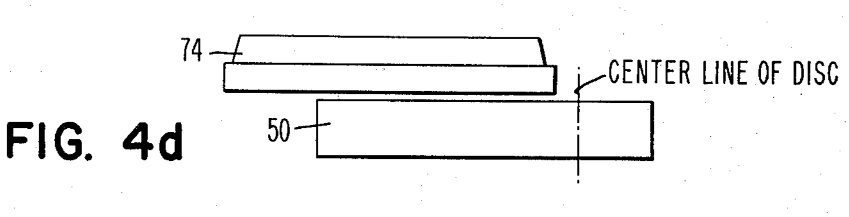
Figure 4E:
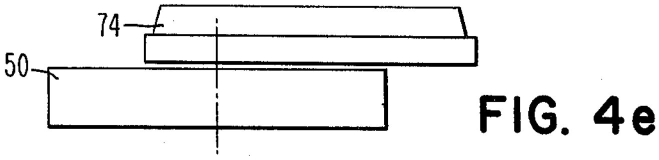
FIGS. 4*e* and 4*f* show the different reach conditions when the carrier and hammer are shifted.
Figure 4F:
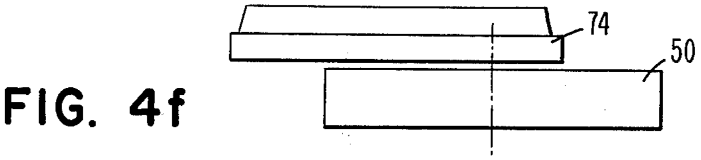
Figure 4G:
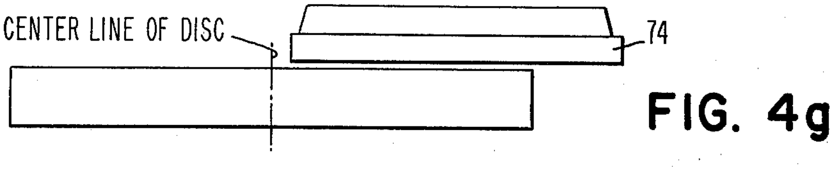
FIGS. 4*g* and 4*h* show the reach conditions for a non-shifted hammer.
Figure 4H:
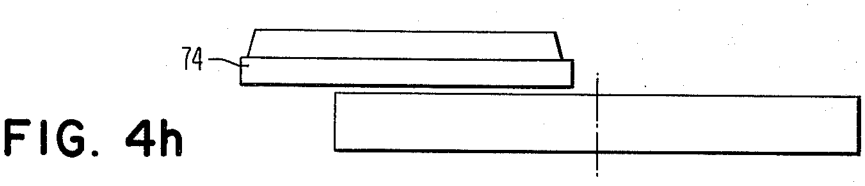

Referring to FIG. 4*a* the print hammer 50 is shown as positioned relative to a type finger 74 for a character 75 at the beginning of the first array. FIG. 4*b* shows the relative position of the print hammer 50 for a type character 75 on a finger 74 near the end of the first array. In FIG. 4*c* the dotted outline shows the position of the print hammer 50 relative to a type finger 74 of a printed character 75 at the beginning of the second array, and 4*d* shows the position of the print hammer 50, when shifted according to the invention, for a type character near the end of the second array. FIG. 4*e* shows the relative position of the print hammer 50 and the type finger 74 for a type character at the beginning of the first or second array in an arrangement where the carrier and print hammer are moved relative to the print position for compensation and FIG. 4*f* shows the relative position of the print hammer 50 and the type finger 74 at the end of either array.

Figure 5:
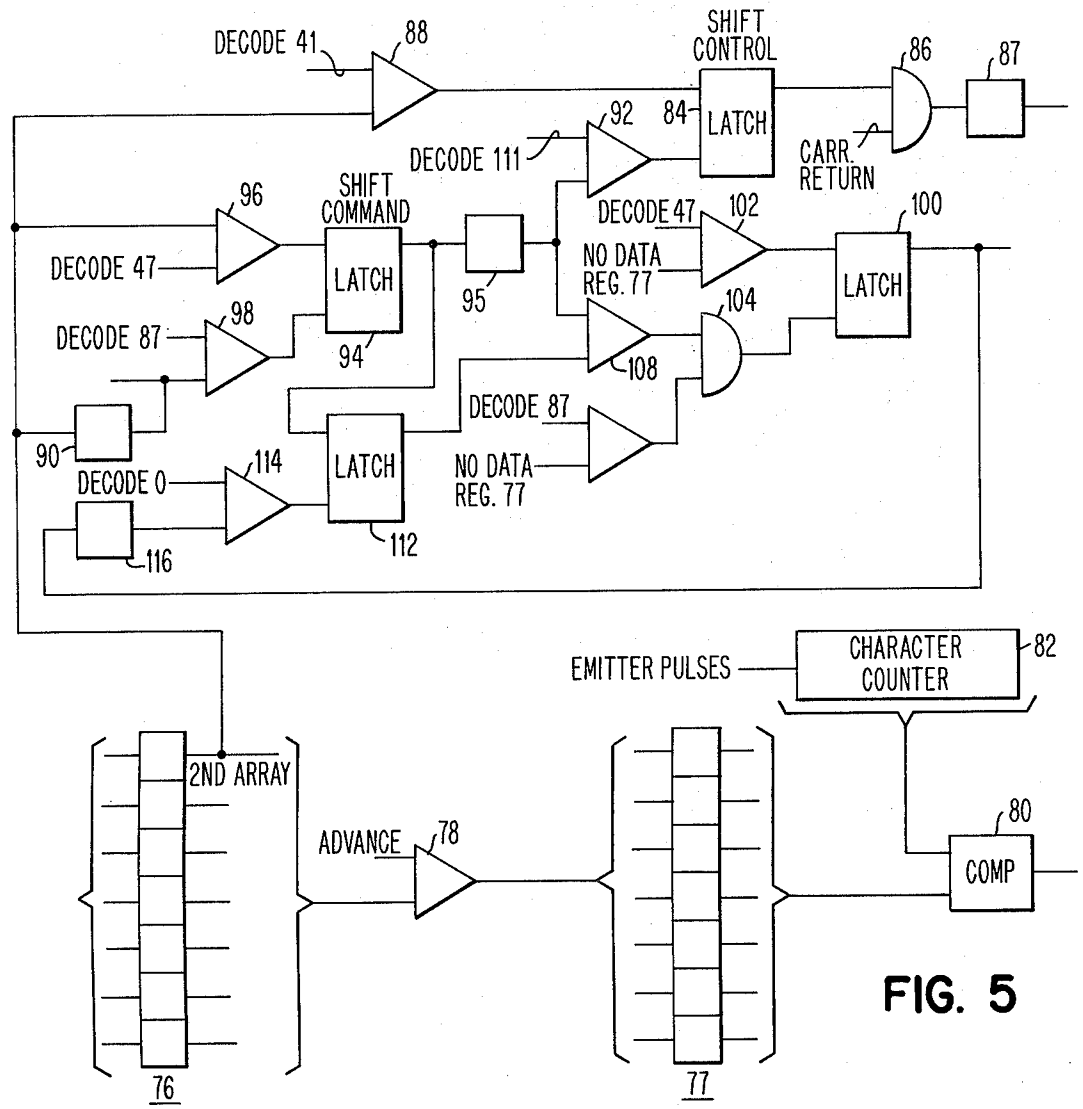
FIG. 5 is a schematic circuit diagram of logic circuitry for controlling the operation of the hammer shift mechanism and the half nut drive of FIG. 1.

Referring to FIG. 5 the reference numeral 76 designates a first character register which is loaded with data representing the character to be printed including an array designation code in the first or upper bit position. Information from the register 76 is gated into a second register 77 by means of a gate 78 in response to an Advance timing signal. The output of the second register 77 is compared in a compare circuit 80 with the character on the print wheel in print position as represented by the output of a print character generator or counter 82 which is driven by pulses from the emitter transducer 46 of FIG. 1. Energization of the shift solenoid 66 of FIG. 1 is controlled by a shift control latch 84 whose ON output is applied to an OR circuit 86, another input to the OR 86 being a carriage return signal. The output of OR 86 is inverted by inverter 87. The shift control latch 84 is set by AND 88 in response to a decode 41 signal (which is the 41st count beyond the Home pulse at the beginning of the first array) from the print character generator 82 indicating the approach of the end of array number 1 and a second array bit from the first position of the data register 76 (The character generator 82 in this instance is a counter which counts emitter pulses up to 48, then jumps to 64 and continues to count to 112 in the usual manner). The shift control latch 84 is reset by AND circuit 92 in response to a decode 111 input and the inverted ON output of a Shift Command latch 94 through inverter 95. The Shift Command latch 94 is set by AND 96 in response to a decode 47 signal and a second array bit signal from the register 76. The latch 94 is reset by AND 98 in response to a decode 87 signal and a first array bit signal from inverter 90 connected to the first bit position of the register 76.

Control of the split nut solenoid 14 is effected by a nut drive latch 100 which is set from AND 102 in response to the decode 47 signal and a signal which indicates that there is data in the register 77. The nut drive latch 100 is reset through OR 104 in response to an output from AND 106 which gates a decode 87 signal with a signal indicating no data in register 77. The nut drive latch 100 is also reset through OR 104 from AND 108 in response to an inverted shaft command signal through inverter 95 and the ON output of a nut control latch 112 which is set by the ON output of the Shift Command latch 94 and reset through AND 114 in response to a decode zero signal and the inverted output of the nut drive latch 100 through inverter 116.

As can be seen from FIG. 5 a second array bit causes the hammer 50 to shift left on decode 41 when the output of AND 88 sets the shift control latch 84, turning on the latch 84 and turning off the output of the inverter 87 to effect de-energization of the shift solenoid 66, so that the compression spring 63 shifts the hammer 50 to the left as shown in FIG. 2. The split nut 12 will be engaged whenever there is data available to be printed and there is a decode 47 signal applied to AND 102. This turns on the nut drive latch 100 and energizes the split nut solenoid 14 to effect engagement of the split nut with the teeth 16 of the lead screw 18 for driving the carrier 10 along the print line. A first array bit following a second array bit causes a shift right to occur on decode 111, when the shift drive latch 84 is reset by AND 92 in response to the decode 111 signal and the inverted output from inverter 95 of the shift command latch 94 which was set by a second array bit and reset by the first array bit signal and the decode 87 signal through AND 98. Two successive first array bits on two successive print cycles will not cause the split nut 12 to be disengaged on the second cycle because the nut control latch 112 has been reset by AND 106, inhibiting the data flow to the drive nut at decode 87. Also, a second array bit following a first array bit does not cause any signal at the nut drive latch 100.

Figure 6:
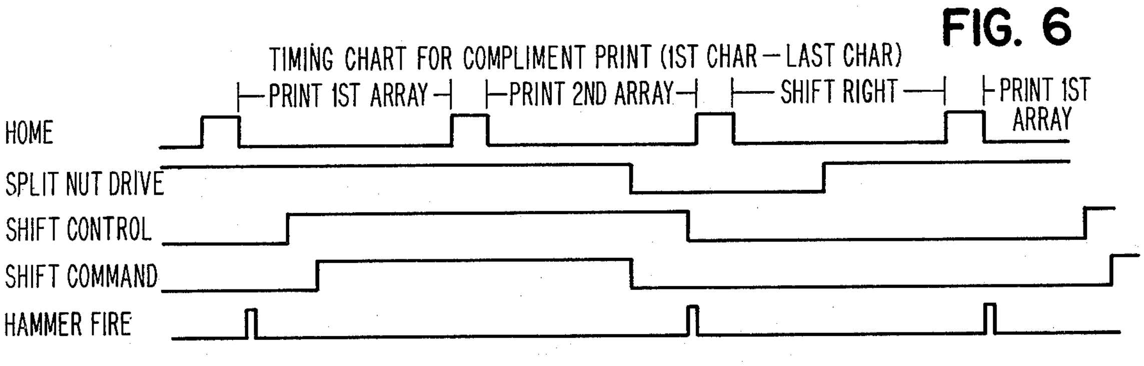
FIG. 6 shows a set of timing curves for the circuit of FIG. 5 when alternating between the first character of the first array and the last character of the second array.

Referring to FIG. 6 it will be seen that the split nut drive latch 100 is de-energized at decode 87. The shift control latch 84 is energized at the decode 41 and de-energized at decode 111. The shift command latch 94 is energized at decode 47 and de-energized at decode 87. Hammer fires are indicated for the first array and second array followed by a shift right and print in the first array.

Figure 7B:
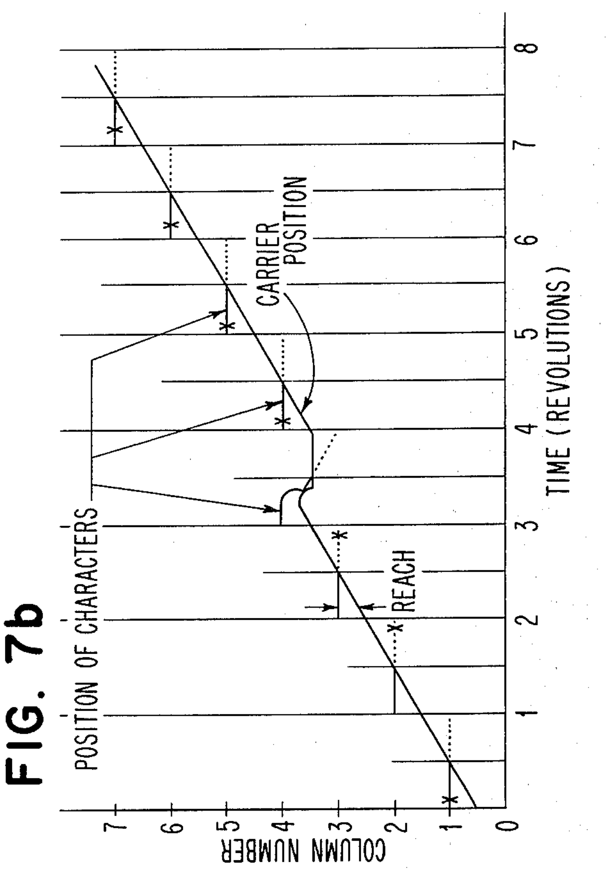
FIGS. 7*a* – 7*d* show typical velocity curves for the carrier under different operating conditions.
Figure 7A:
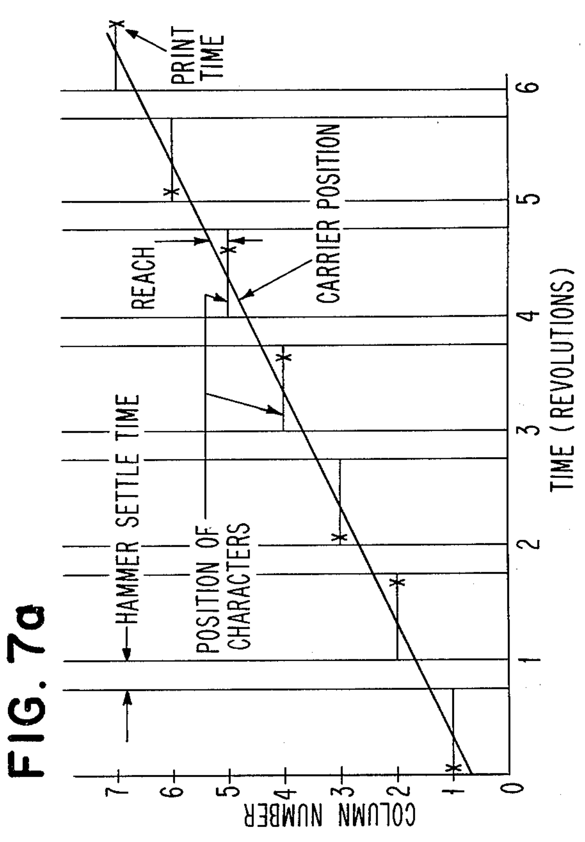

FIG. 7*a* shows the timing for a conventional on-the-fly printer using a rotating print disc. The carrier moves at a constant velocity as shown by the diagonal line designated carrier position. The characters move with respect to the carrier in such a way that they appear first in column 1, then in column 2, etc. A portion of the print wheel is left empty so that there is a period of time available for the hammer to settle between printing in successive columns under all conditions. In this way printing can continue indefinitely with the carrier going at a constant velocity.

A disadvantage of the method just described is the wheel diameter and hence peripheral velocity required because of the empty portion of the wheel. If this empty portion is left out, the wheel has a smaller peripheral velocity at the same printing speed. Or, the printing speed can be increased while maintaining a constant peripheral velocity. FIG. 7*b* shows how this is accomplished by dividing the characters into two arrays without hammer shift according to the present invention. During the first half revolution the first array goes by the print position and the position of these characters is shown by a solid line. During the second half revolution the second array goes by the print position and the position of these characters is shown by a dotted line. Printing can continue uninterrupted as long as characters are printed only from the first array (solid lines) since settle-out occurs while the second array is passing by. Note by looking at the print times in revolutions 1 and 2 of FIG. 76 designated by *x*'s that printing can change from the first array to the second array and remain in the second array without any carrier interruption. However, when printing changes from the second array to the first array without an intervening space, there may not be enough time for hammer settle-out and the carrier must be stopped. This is shown as occuring during the fourth revolution in FIG. 7*b*.

The time available for stopping and restarting the carrier is from the end of revolution 3 to the beginning of revolution 5 or one revolution or 33 milliseconds for a 30 character-per-second printer. Note that in FIG. 7*b* the reach is greater than in FIG. 7*a* and this is a disadvantage in disc type printers printing at or near the 12 o'clock position.

Figure 7D:
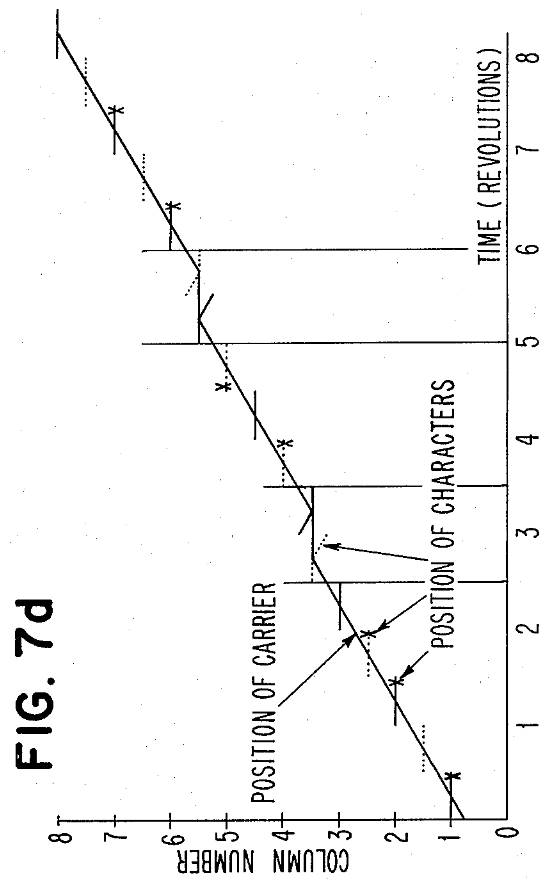
Figure 7C:
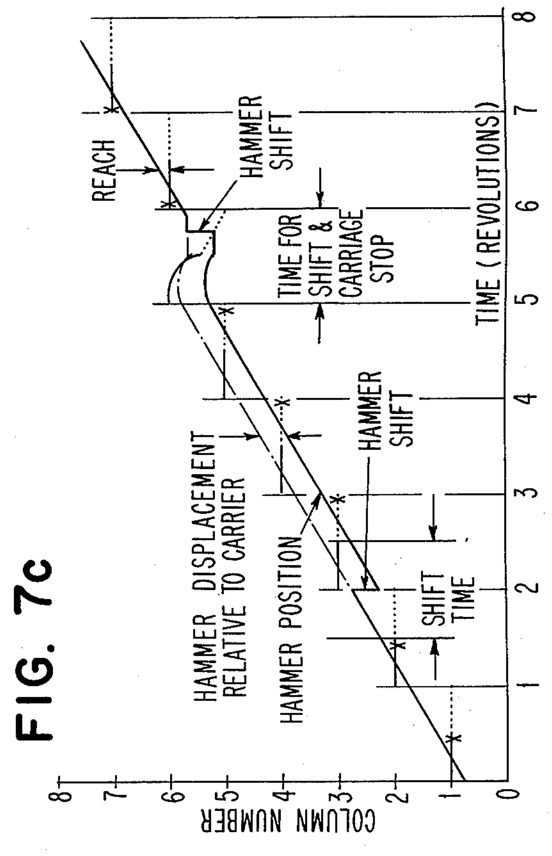

This reach can be reduced in two basic manners. One is to place the second set of characters so as to print in the same column location as the first set but to move the hammer to more nearly align. This effect is shown in FIG. 7*c*. Note that printing occurred during the first array on the first and second wheel revolution, but since the printing occurred during the second array on the third revolution, the hammer was shifted back to align with the second set (i.e., the dotted line). The time allowed is from 1.5 to 2.5 wheel revolutions. This function would also have been achieved simply by having a second hammer in the shifted position. In the fifth column a character from the second array was printed but a character from the first array is required in column 6. Hence the carrier must be stopped for one cycle and the hammer must be shifted back. The time allowed is from 5.0 to 6.0 for both of these operations to occur. Of course they can occur simultaneously.

Another way to reduce reach is to move the whole carrier including the hammer (as used herein, reach is the distance between the centerline of the hammer and the centerline of the print column at the time of printing). In this case the print wheel is laid out in such a manner that the first array of characters prints at the column locations but the second array of characters prints intermediate to the column locations as shown by the dotted lines in columns 1 to 3 in FIG. 7*d*. To cause printing from the second array of characters the carrier is stopped for one half of a revolution. This causes the second array of characters (dotted line) to be on column location, so that printing can occur from the second array. The time allowed for the carrier to fall back relative to its previous pass— is from 2.5 to 3.5 or 33 milliseconds for a 30 cps printer. A switch back to the first array is made between 5.0 and 6.0 revolutions. Roman numerals two, three, and four of the previously recited four ways in which the hammer 50 can be moved with respect to the printed columns, are different ways of achieving the result shown in FIG. 7*d*.

Figure 9:
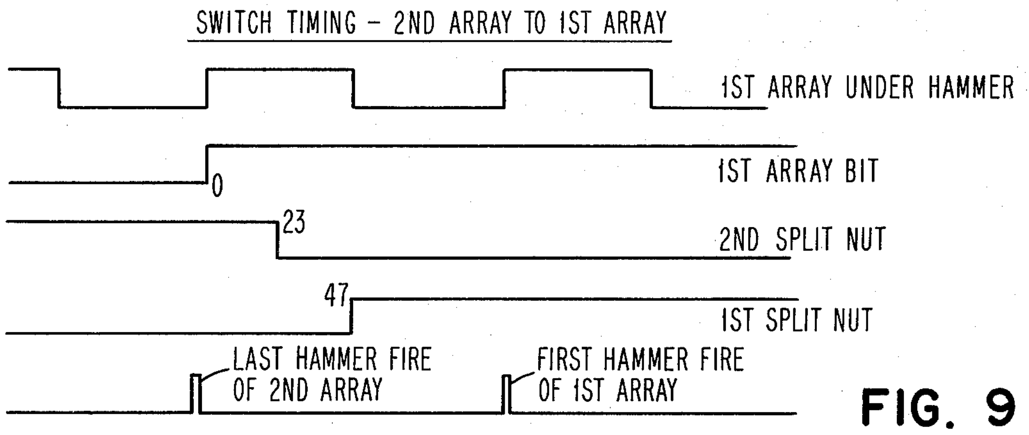
FIGS. 9 and 10 show half nut timing curves for a switch from second array to first array, and a switch from first array to second array, respectively.
Figure 10:
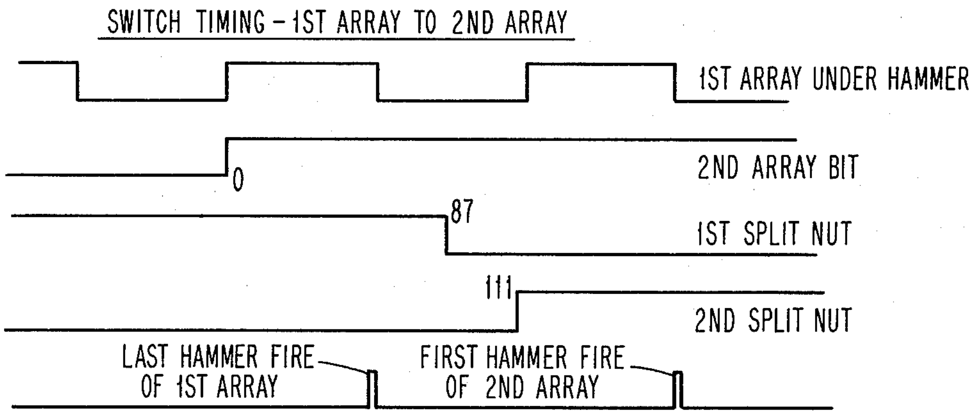

In FIG. 8 there is shown a schematic circuit diagram of logic and apparatus for effecting operation of the carrier to shift one half a print position. This is effected by using an additional split nut **12*a* which is positioned one half pitch to the left of the split nut 12. Split nut 12 is controlled by latch 100 being set by AND 120 in response to first array bit, decode 47 and data in Reg. 77. AND 122 resets latch 100 in response to decode 23 and either of second array bit or No data in Reg. 77 from OR 124. A second split nut drive latch 100*a* is utilized for controlling the energization of a split nut solenoid 14*a* operating the second split nut 12*a*. The latch 100*a* is set by AND 120*a* in response to a second array bit, decode 111, and data in register 77. The latch 100*a* may be reset by AND 122*a* in response to decode 23 and the output of OR 124*a* which is either first array bit or no data in register 77. By thus operating the first and second split nut latches 100 and 100*a* the carrier 10 may be moved one half pitch relative to a moving thread on the lead screw. The timing for operation of the two half nuts is shown in FIGS. 9 and 10.**

From the above description and the accompanying drawing, it will be apparent that the present invention provides a simple and effective method of improving the performance of a rotating disc printer. No dead space is necessary for hammer settle-out time and the maximum utilization of the operating mechanism may be achieved. By shifting the print hammer in accordance with the change from a first array to a second array or vice versa reach is minimized and improved performance is attained.

While the invention has been shown and described with reference to preferred embodiments thereof, it will be understood by those skilled in the art that various changes in form and details may be made therein without departing from the spirit and scope of the invention.

What is claimed is:

1. The combination in printing apparatus of a carrier having drive means operable to move said carrier past a plurality of print column positions along the print line of a document upon which a printing operation is to be performed, a rotating print wheel mounted on said carrier having an array of type characters of one group thereon around one portion of the periphery of the wheel and another array of type characters of a different group around another portion of the periphery of the print wheel, said print wheel having means to rotate said print wheel to present said type characters of both groups to each print column position, a print hammer carried by said carrier operable to impact said type characters and print in said print column positions on said document, and means to detect when the required printing changes from one selected print group to the other selected print group and to inhibit printing from two timewise adjacent groups, and means selectively operable to provide additional movement of said print hammer along said print line less than one of said print column positions in accordance with which group of type characters is positioned to print in a print column position so as to cause said hammer to be more nearly centered in the appropriate column position when said selected print group is in print column position in front of the hammer.

2. The invention as defined in claim 1 characterized by said carrier being movable along said print line and said means providing additional movement of said print hammer to cause said hammer to be more nearly centered in the appropriate column comprising means movably mounting said print hammer on said carrier for movement in a direction along said print line relative to said carrier.

3. The invention as defined in claim 1 characterized by said type characters of said one group comprising principally lower case type characters and said type characters of said different group comprising principally upper case characters.

4. The invention as defined by claim 1 characterized by said means providing additional movement of said print hammer further comprising a pair of leaf springs and electromagnetic shift means connecting said print hammer to said carrier for shifting said print hammer on said carrier in a direction along said print line.

5. The invention as defined in claim 1 characterized by said means providing additional movement of said print hammer including a character register containing a representation of a character to be printed, means including a logic circuit connected to said register to determine the group position on said print wheel of said character having a representation in said register, and shift control means connected to said array determining means and said print hammer shift means for selectively operating said hammer shift means in accordance with said group position of said character.

6. The invention as defined in claim 5 characterized by said carrier drive means including operating means connected to said shift control means to selectively connect and disconnect said carrier to and from said drive means when said shift control means operates to shift said print hammer from said another group position to said one group position.

7. The invention as defined in claim 1 characterized by said means providing additional movement of said print hammer including a rotatable threaded drive shaft and half nut means operable to selectively connect said carrier to be driven by said drive shaft.

8. The invention as defined in claim 7 characterized by said rotatable threaded drive shaft having threads with a predetermined pitch and said half nut means including a pair of half nuts positioned on said carrier to connect said carrier to said threaded drive shaft in other than an integral pitch relations.

9. The invention as defined in claim 8 characterized by logic circuit means for selectively effecting operation of said half nuts to position said carrier in different non-integral pitch relations comprising fractional pitch relations on said threaded shaft.

* * * * *